US007702055B2

(12) United States Patent  (10) Patent No.: US 7,702,055 B2
Edgar  (45) Date of Patent: Apr. 20, 2010

(54) APPARATUS AND METHOD FOR TRACING PROCESSOR STATE FROM MULTIPLE CLOCK DOMAINS

(75) Inventor: Ernest L. Edgar, Larkspur, CO (US)

(73) Assignee: MIPS Technologies, Inc., Mountain View, CA (US)

( * ) Notice: Subject to any disclaimer, the term of this patent is extended or adjusted under 35 U.S.C. 154(b) by 776 days.

(21) Appl. No.: 11/537,584

(22) Filed: Sep. 29, 2006

(65) Prior Publication Data

US 2008/0080651 A1    Apr. 3, 2008

(51) Int. Cl.
    *H04L 7/00*    (2006.01)
(52) U.S. Cl. ..................................... 375/356
(58) Field of Classification Search ................. 375/354, 375/355, 356, 371, 372, 377; 370/389, 413, 370/395.31; 710/29, 52, 53, 56, 57
    See application file for complete search history.

(56) References Cited

U.S. PATENT DOCUMENTS 6,754,599 B2    6/2004    Swoboda et al.
6,868,376 B2    3/2005    Swoboda
7,272,672 B1*   9/2007    Swenson et al. .............. 710/29
2004/0218597 A1* 11/2004  Choi et al. .................. 370/389

OTHER PUBLICATIONS

CoreSite On-chip Debug and Trade Technology [online], [retrieved on Nov. 14, 2006], Retrieved from the Internet: <URL: http://www.arm.com/products/solutions/CoreSight.html>, 3 pages.
ARM CoreSight, brochure, www.arm.com, Jan. 10, 2004, 2 pages.

* cited by examiner

*Primary Examiner*—Sam K Ahn
(74) *Attorney, Agent, or Firm*—Cooley Godward Kronish LLP

(57) ABSTRACT

A method of tracing processor data includes receiving a first trace stream from a first processor operating in response to a first clock and a second trace stream from a second processor operating in response to a second clock. The first trace stream is routed to a first dual-port synchronous memory in accordance with the first clock and the second trace stream is routed to a second dual-port synchronous memory in accordance with the second clock. The first trace stream and the second trace stream are delivered to a memory in accordance with a third clock.

19 Claims, 4 Drawing Sheets

US 7,702,055 B2

APPARATUS AND METHOD FOR TRACING PROCESSOR STATE FROM MULTIPLE CLOCK DOMAINS

BRIEF DESCRIPTION OF THE INVENTION

This invention relates generally to digital data processors. More particularly, this invention relates tracing processor state information from digital systems with multiple clock domains.

BACKGROUND OF THE INVENTION

Many systems with multiple processors operate those processors with independent clocks. Since real-time processor trace outputs are synchronous with the processor clocks, a debug instrument capable of receiving and correlating multiple trace streams must account for the multiple clock domains.

One approach to addressing this problem is to record each processor's trace using an independent instrument, each of which uses the clock source associated with a given processor. This technique facilitates the reliable recording of trace information. However, it is difficult to correlate the independently timed trace information. To address this problem, some systems record a trigger into all buffers at a synchronization point and then present activity from the trace point forward in time order knowing the rate at which the trace clock for each buffer operates. The problem with this approach is that a typical clock source has limited accuracy. Due to clock uncertainty and drift, time alignment is lost after a few thousand cycles from the synchronization point.

In view of the foregoing, it would be desirable to provide an improved technique for tracing information from multiple clock domains.

SUMMARY OF THE INVENTION

The invention includes a method of tracing processor data. The method includes receiving a first trace stream from a first processor operating in response to a first clock and a second trace stream from a second processor operating in response to a second clock. The first trace stream is routed to a first dual-port synchronous memory in accordance with the first clock and the second trace stream is routed to a second dual-port synchronous memory in accordance with the second clock. The first trace stream and the second trace stream are delivered to a trace memory in accordance with a third clock.

The invention also includes a computer readable storage medium storing executable instructions to characterize a circuit. The executable instructions include instructions to receive a first trace stream from a first processor operating in response to a first clock and a second trace stream from a second processor operating in response to a second clock. The first trace stream is routed to a first dual-port synchronous memory in accordance with the first clock and the second trace stream is routed to a second dual-port synchronous memory in accordance with the second clock. The first trace stream and the second trace stream are delivered to a trace memory in accordance with a third clock.

The invention also includes a probe with a plurality of dual-port synchronous memories to receive a plurality of trace streams in accordance with a plurality of clock signals. Control logic routes the plurality of trace streams to a trace memory in accordance with a local clock.

The invention also includes a probe with a multiple clock domain with a plurality of trace streams operating in accordance with a plurality of clock signals. A local clock domain routes the plurality of trace streams to a trace memory in accordance with a local clock.

The invention also includes a system with a plurality of processors generating a plurality of trace streams in accordance with a plurality of clock signals. The invention also includes a probe with a plurality of dual-port synchronous memories to receive the plurality of trace streams in accordance with the plurality of clock signals and control logic to route the plurality of trace streams to a memory in accordance with a local clock.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Rather than record each trace stream independently, as done in the prior art, the current invention combines trace streams into one, common trace stream using a re-clocking scheme. The single stream inherently records items from all trace streams in the order in which they occurred so no post-processing alignment techniques are required. The invention utilizes synchronous dual-port memories (e.g., First-In-First-Out (FIFO) buffers) that are responsive to clock signals from a multiple clock domain and a local clock domain. Data writes to the memories are performed in accordance with the multiple clock domain signals, while data reads are performed using the local clock domain.

Figure 1:
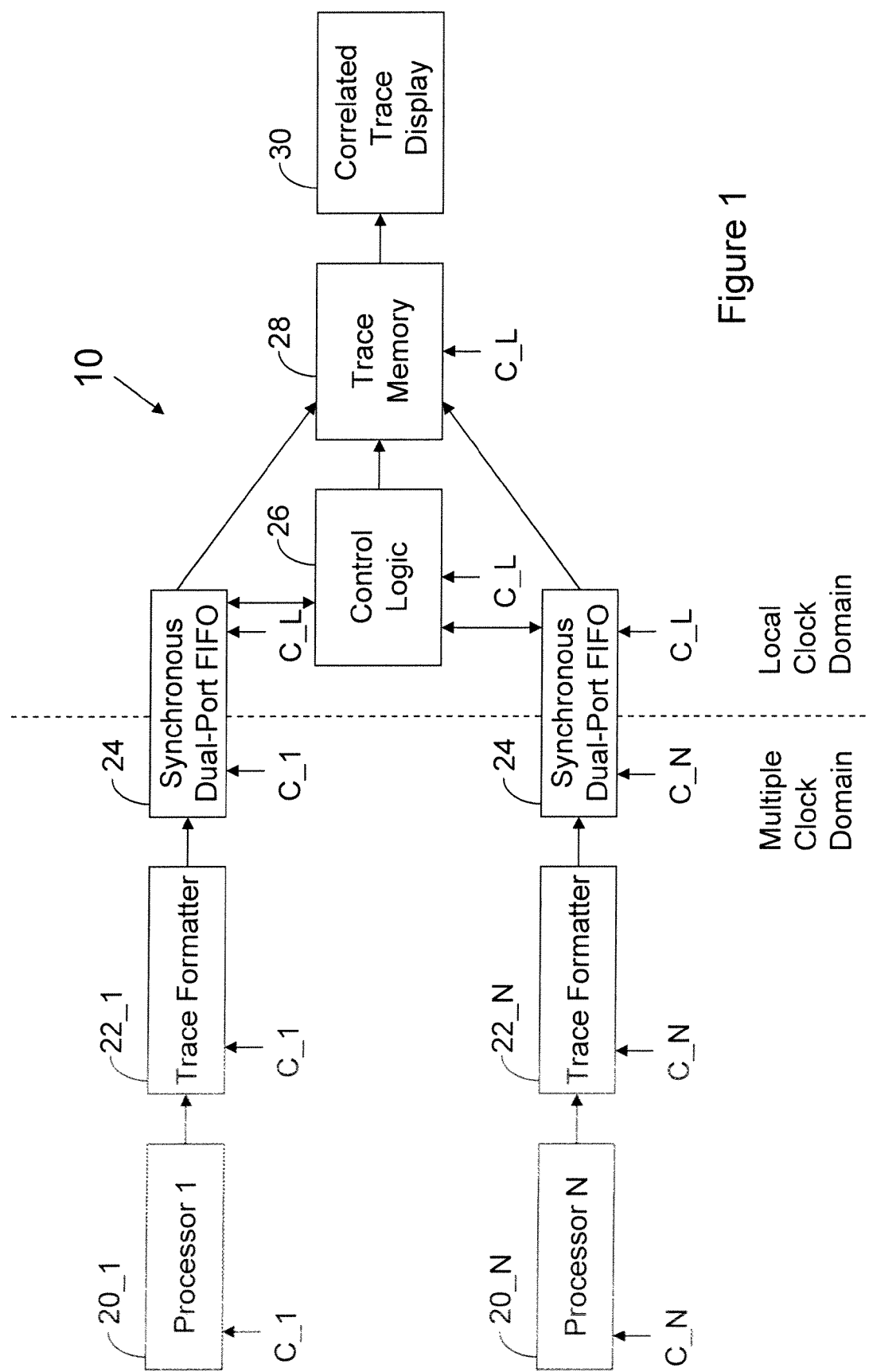
FIG. 1 illustrates a system configured in accordance with an embodiment of the invention.

FIG. 1 illustrates a system 10 configured in accordance with an embodiment of the invention. A set of processors 20_1 through 20_N form a part of a multiple clock domain. A first processor 20_1 generates first trace information in accordance with a first clock C_1. The trace information is delivered to a trace formatter 22_1, which adds information to the trace information to identify the data source and clock domain. The trace formatter 22_1 operates in response to the first clock C_1. The output of the trace formatter 22_1 is applied to a synchronous dual-port memory 24, in this embodiment, implemented as a FIFO. The synchronous dual-port FIFO 24 reads the trace information in accordance with the first clock C_1.

Similarly, a second processor 20_N generates second trace information in accordance with a second clock C_N The trace information is delivered to a trace formatter 22_N, which adds information to the trace information to identify the data source and clock domain. The trace formatter 22_N operates in response to the second clock C_N. The output of the trace formatter 22_N is applied to a synchronous dual-port FIFO 24. The synchronous dual-port FIFO 24 reads the trace information in accordance with the second clock C_N.

Control logic 26 coordinates the operation of each synchronous dual-port FIFO 24. When data is written to a synchronous dual-port FIFO 24, the dual-port FIFO 24 generates a non-empty signal, which is applied to the control logic 26. Preferably, the control logic 26 includes two sequential flip-flops to process the non-empty signal to insure signal stability.

Figure 2:
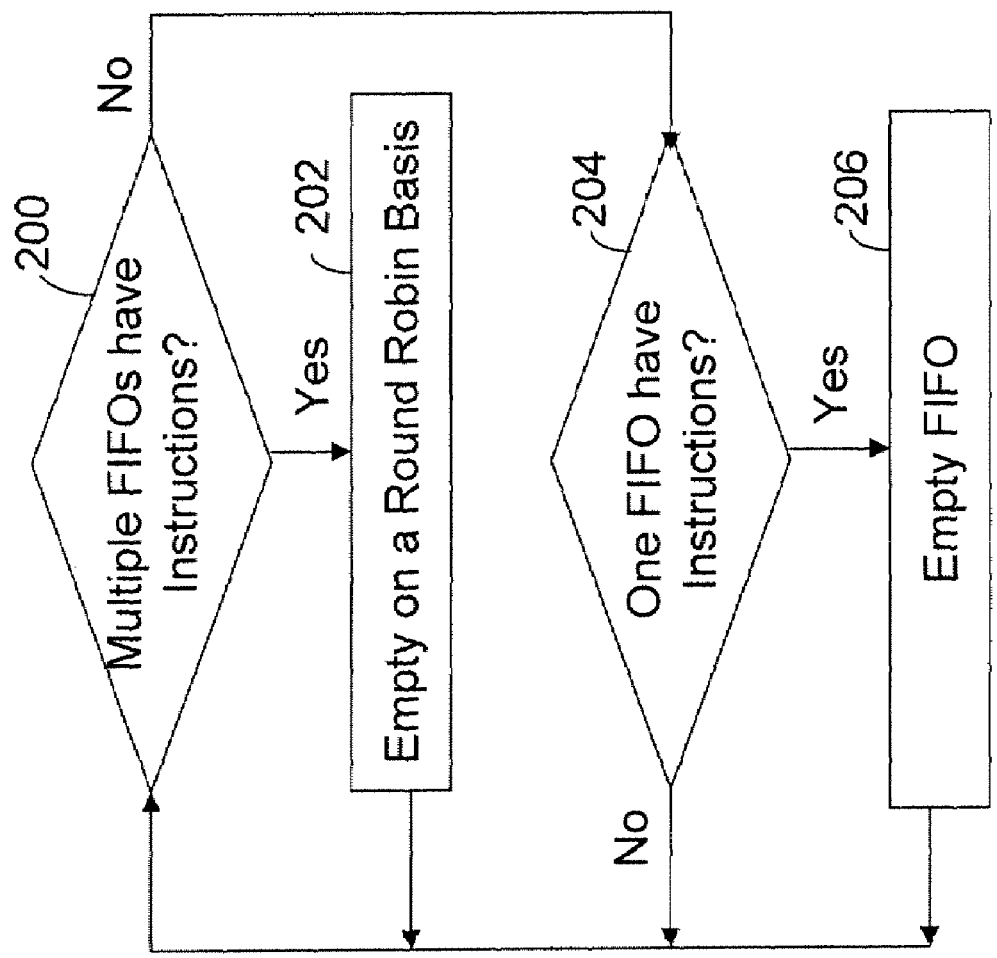
FIG. 2 illustrates processing operations associated with an embodiment of the invention.

FIG. 2 illustrates control operations implemented by an embodiment of the control logic 26. If multiple FIFOs have instructions (200—Yes), the individual FIFOs are emptied on a round robin basis 202. Each FIFO is emptied in accordance with a common local clock C_L.

If the multiple FIFOs do not have instructions (200—No), control proceeds to block 204. If the FIFOs are empty (204—No), control returns to block 200. Otherwise, if a single FIFO has instructions (204—Yes), the single FIFO is emptied 206 in accordance with the local clock C_L. Control then returns to block 200.

The control logic 26 may also be implemented to insert time stamps. In addition, the control logic 26 may be used to insert tag bits to indicate which stream the data originated from. This tag bit functionality may be used, for example, if the trace formatter 22 is omitted.

Returning to FIG. 1, trace information from each FIFO is applied to a trace memory 28, which operates in accordance with the local clock C_L. The trace information may then be written to a correlated trace display 30.

Figure 3:
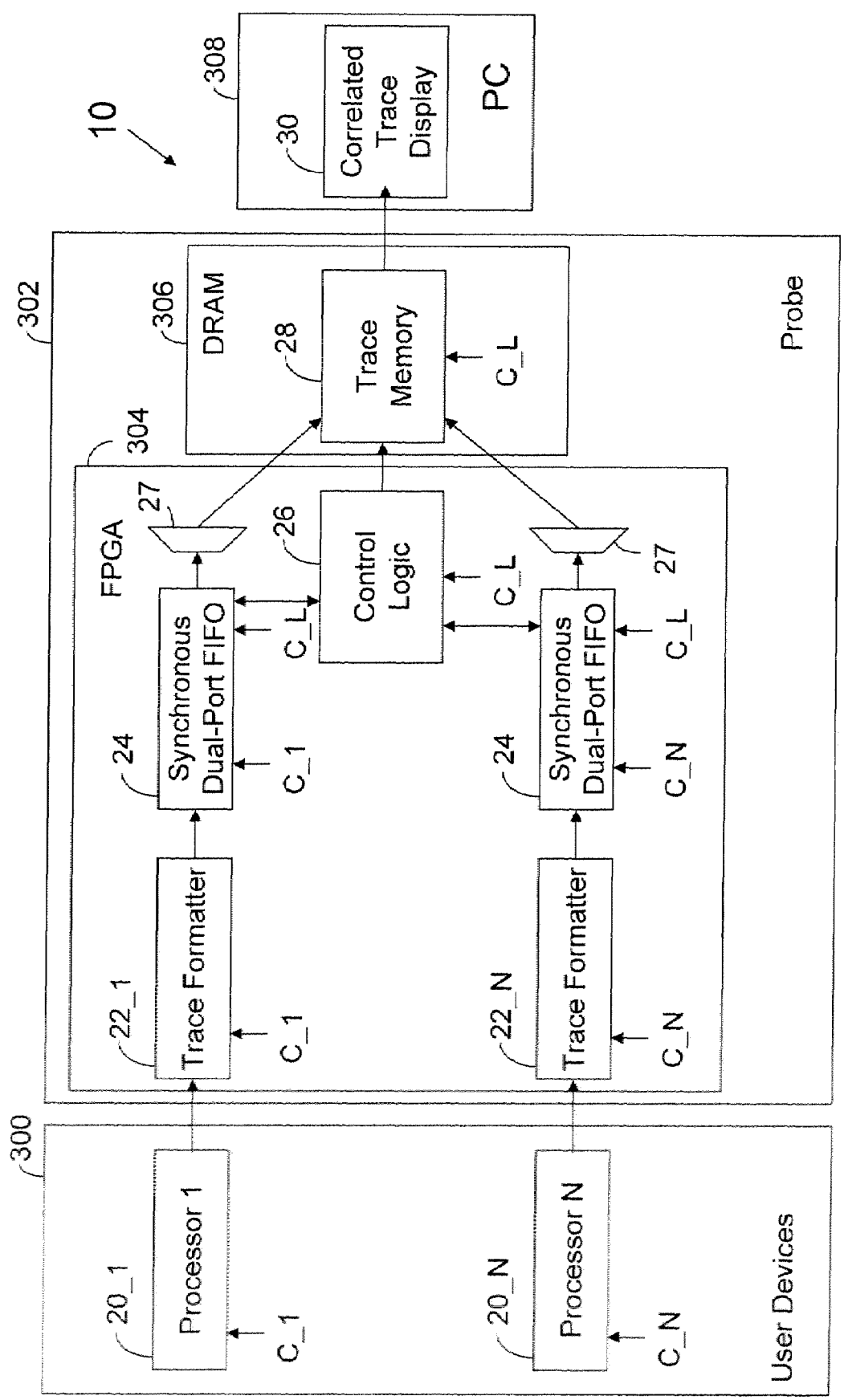
FIG. 3 illustrates a system configured in accordance with an embodiment of the invention.

FIG. 3 illustrates another embodiment of the system 10 of the invention. The processors 20_1 through 20_N form a set of user devices 300. In one embodiment of the invention, a probe 302 includes a Field Programmable Gate Array (FPGA) 304 to implement the trace formatters 22, synchronous dual-port FIFOs 24 and control logic 26. The FPGA 304 may also implement width adjusting circuits 27 (e.g., de-multiplexers). Ordinarily, real-time trace ports are relatively narrow (e.g., 16 bits) and operate at high speed (e.g., 333 MHz). In one embodiment of the invention, the width adjusting circuits 27 de-multiplex the narrow, fast trace port into a wide, slower data stream, which is fed to the trace memory 28. Alternately the width adjusting circuits 27 may feed the synchronous dual-port FIFOs 24. In one embodiment of the invention, two 16-bit/333 MHz trace streams are converted to two 64-bit/83 MHz streams. If the FIFO recording logic operates on 64-bit data at 266 MHz, the FIFO output has plenty of bandwidth to ensure that FIFOs are emptied in a timely manner in order to maintain temporal relationship between the two trace streams.

FIG. 3 illustrates that the trace memory 28 is implemented in DRAM 306. The figure also illustrates that the correlated trace display 30 forms a part of an external computation device, such as a personal computer 308. In embodiments of the invention, trace streams are combined into a single common stream and are stored in DRAM 306. The common stream identifies events from all trace streams in the order of occurrence across multiple clock domains. Embodiments of the invention provide accuracy in time and ordering of events, which is crucial when debugging complex multi-processor systems. Advantageously, event ordering occurs without any post-processing software overhead and does not require implementation of any heuristic alignment algorithms.

Figure 4:
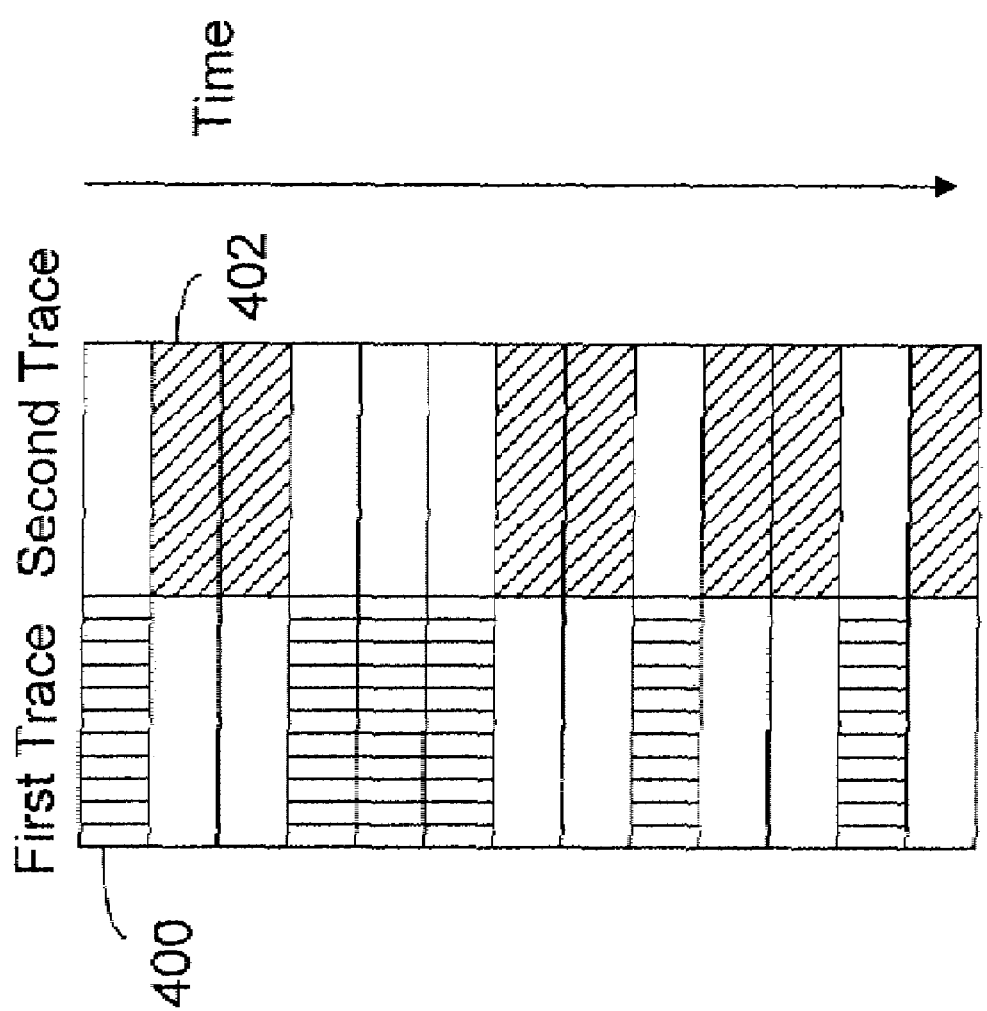
FIG. 4 illustrates trace information produced in accordance with an embodiment of the invention.

FIG. 4 illustrates exemplary correlated trace information generated in accordance with an embodiment of the invention. A first trace has trace instructions indicated by vertical lines in blocks 400, while a second trace has trace instructions indicated by diagonal lines in blocks 402. At any point in time, an instruction from one domain or another may be written. As time advances, instructions from different clock domains are displayed and can be compared side-by-side. FIG. 4 illustrates a system with two clock domains; naturally, this technique may be applied to any number of clock domains. Display software takes multiple streams of interleaved trace data from DRAM 306 for presentation in a human readable form. The display software extracts the recorded trace and displays the individual trace streams side-by-side while maintaining the time correlation implied from the order in which trace records are found in the trace memory. It is particularly useful that the display software presents trace information as both a stream of trace events from each individual processor and as visually aligned trace events showing what each processor is doing at a selected point in time.

The techniques of the invention are applicable to any trace environment. While the invention is disclosed in connection with processors, it should be understood that the reference to a processor includes logic and buses. Thus, for example, one processor may refer to a traditional processor, while another processor may refer to a bus. The techniques of the invention are scalable to any number of trace ports.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalents.

The invention claimed is:

1. A method of tracing processor data, comprising:
receiving a first trace stream from a first processor operating in response to a first clock and a second trace stream from a second processor operating in response to a second clock operating at a different speed than the first clock;

routing the first trace stream to a first dual-port synchronous memory in accordance with the first clock and the second trace stream to a second dual-port synchronous memory in accordance with the second clock; and delivering the first trace stream and the second trace stream to a trace memory in accordance with a third clock operating at different speed than the first clock and the second clock.

2. The method of claim 1 further comprising:
converting the first and second trace streams to wider and slower trace streams prior to delivering to the memory.

3. The method of claim 1 wherein delivering includes delivering the first trace stream and the second trace stream to the memory in a round robin manner.

4. The method of claim 1 further comprising displaying the first and second trace streams.

5. A non-transitory computer readable storage medium, comprising executable instructions that when executed by a computer cause the computer to characterize a circuit that operates to:
receive a first trace stream from a first processor operating in response to a first clock and a second trace stream from a second processor operating in response to a second clock operating at a different speed than the first clock;
route the first trace stream to a first dual-port synchronous memory in accordance with the first clock and the second trace stream to a second dual-port synchronous memory in accordance with the second clock; and
deliver the first trace stream and the second trace stream to a trace memory in accordance with a third clock operating at different speed than the first clock and the second clock.

6. The non-transitory computer readable storage medium of claim 5 further comprising executable instructions to:
convert the first and second trace streams to wider and slower trace streams prior to delivery to the memory.

7. The non-transitory computer readable storage medium of claim 6 wherein the executable instructions to deliver include executable instructions to deliver the first trace stream and the second trace stream to the memory in a round robin manner.

8. The non-transitory computer readable storage medium of claim 5 further comprising executable instructions to define control logic for the first dual-port synchronous memory and the second dual-port synchronous memory.

9. A probe, comprising:
a plurality of dual-port synchronous memories to receive a plurality of trace streams in accordance with a plurality of clock signals operating at different speeds; and
control logic to route the plurality of trace streams to a trace memory in accordance with a local clock operating at a different speed than the plurality of clock signals.

10. The probe of claim 9, further comprising:
a trace formatter to receive a trace stream in accordance with an external clock;
wherein a dual-port synchronous memory receives the trace stream and processes the external clock and the local clock to produce an output stream in accordance with the local clock.

11. The probe of claim 10 further comprising a width adjusting circuit to convert the output stream to a wider and slower output stream.

12. The probe of claim 9, wherein the plurality of dual-port synchronous memories each deliver a status signal to the control logic.

13. The probe of claim 12, wherein the control logic routes the plurality of instruction trace streams in a round robin manner.

14. A probe, comprising:
a multiple clock domain with a plurality of trace streams operating in accordance with a plurality of clock signals;
multiple dual-port synchronous FIFOs to receive the plurality of trace streams; and
a local clock domain to route the plurality of trace streams to a memory in accordance with a local clock;
wherein each dual-port synchronous FIFO includes an input port to receive a trace stream in accordance with an external clock and each dual-port synchronous FIFO processes the external clock and the local clock to produce an output stream in accordance with the local clock.

15. The probe of claim 14 further comprising a width adjusting circuit to convert the output stream to a wider and slower output stream.

16. A system, comprising:
a plurality of processors generating a plurality of trace streams in accordance with a plurality of clock signals operating at different speeds; and
a probe, including:
a plurality of dual-port synchronous memories to receive the plurality of trace streams in accordance with the plurality of clock signals, and
control logic to route the plurality of trace streams to a trace memory in accordance with a local clock operating at a different speed than the plurality of clock signals.

17. The system of claim 16 wherein the plurality of dual-port synchronous memories and the control logic are formed in a programmable logic device.

18. The system of claim 16 wherein the trace memory is DRAM.

19. The system of claim 16 in combination with a display to present the plurality of trace streams.

* * * * *